April 15, 1969     J. GORMLEY     3,439,228
MONITORING DEVICE
Filed Oct. 21, 1966     Sheet 1 of 2
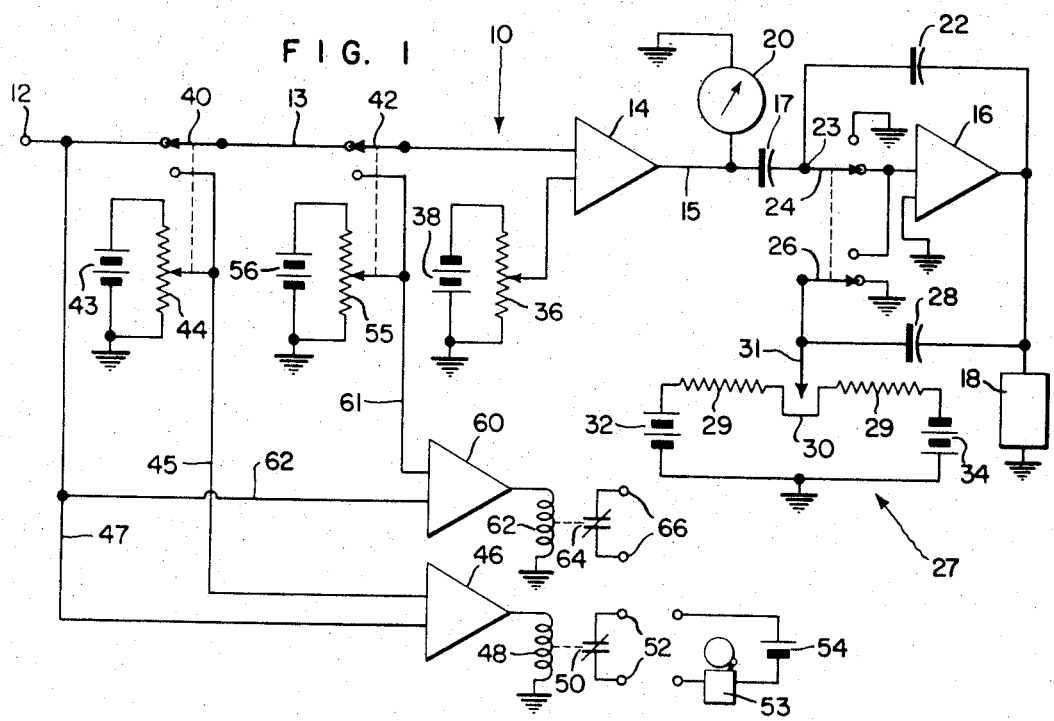
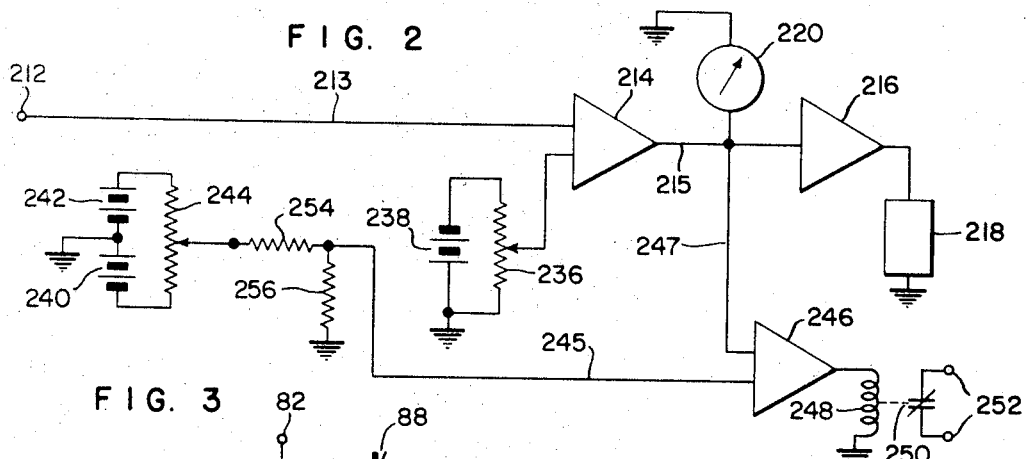
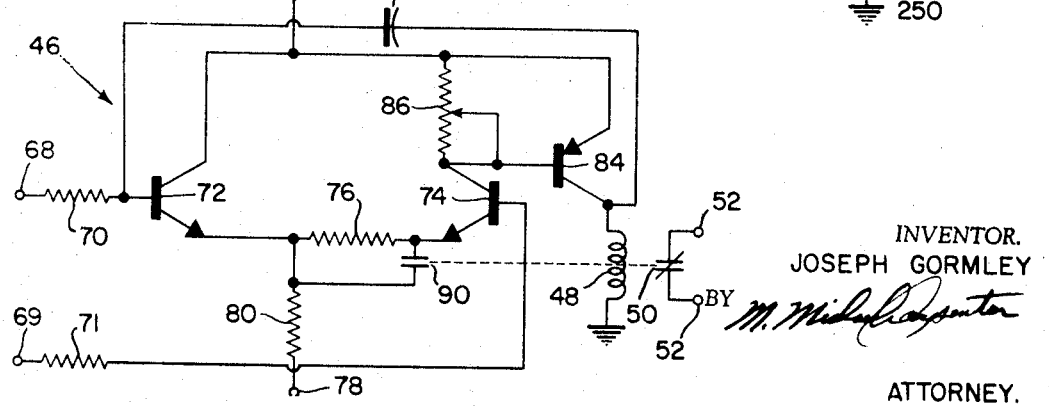
INVENTOR.
JOSEPH GORMLEY
BY
ATTORNEY.

INVENTOR.
JOSEPH GORMLEY

United States Patent Office 3,439,228
Patented Apr. 15, 1969

3,439,228
MONITORING DEVICE
Joseph Gormley, Philadelphia, Pa., assignor to Honeywell Inc., Minneapolis, Minn., a corporation of Delaware
Filed Oct. 21, 1966, Ser. No. 588,526
Int. Cl. H01h 47/32; G01r 1/02; G08b 21/00
U.S. Cl. 317—148.5
13 Claims

ABSTRACT OF THE DISCLOSURE

A monitoring device is shown having a first amplifier to which an indicator and a load are connected and a second amplifier to which an alarm is connected. The first amplifier receives an input signal and a first generated reference signal, while the second amplifier receives the input signal and a second generated reference signal. The first generated reference signal is adjustable to a point at which it is desired to provide an alarm, as indicated by the indicator. The second generated reference signal is then adjusted to the indicated alarm point. In operation, the second amplifier provides an alarm signal when the input signal monitored thereby reaches the established alarm point.

---

The present invention relates to a monitoring device and, more particularly, to a device which monitors an input signal and may be adjusted to a predetermined setting for actuating an output circuit when the monitored input signal reaches a value equivalent to the predetermined setting.

Prior art devices adapted to provide a monitoring function are often housed within a separate unit from the device which they monitor. These monitoring devices have therefore required a separate indicating means, such as a meter, for indicating their adjustable setting. Generally, the indicating means for the monitoring device produces an indication which is not proportional to or linear with the indication produced by the indicating means for the monitored device. Thus, in prior art devices, a conversion table or scale is often required to provide a meaningful setting of the monitoring device. Some prior art devices have incorporated a monitoring device into a monitored device through the association of mechanical means with the indicating means. These mechanical means have included camming arrangements which mechanically actuate a switch when the indicating means reaches a predetermined setting. The present invention provides a monitoring device which is incorporated into the housing of the monitored device and which provides for the setting thereof through the use of electrical means and the indicator associated with the monitored device. Monitoring devices, such as the present invention, may be utilized within process controllers which provide automatic control of many industrial processes. The process controller receives an input signal from an automatic sensor, compares that signal against a received set point signal for establishing an error or deviation signal, and provides an output signal for controlling a load in the form of a final control element. The input signal from the automatic sensor may represent many process components, such as pressure, flow rate, temperature, thickness, or any other physical, electrical, or chemical condition. The input signal and the set point signal are utilized by the process controller for providing an output signal which automatically adjusts a final control element, such as a pump, valve, or heater, for returning the process to its set point.

Accordingly, one object of the present invention is to provide a monitoring device with electrical means for adjusting the setting thereof.

Another object of the present invention is to provide a monitoring device capable of producing an output when an input signal, which the device is monitoring, reaches a predetermined level.

Still another object of this invention is to provide a monitoring device which actuates an output circuit when the deviation between an input signal and a set point signal becomes greater than a previously determined amount.

Yet another object of the instant invention is to provide a monitoring device which does not require its own indicating means for adjustment, but which may be adjusted through the utilization of an indicating means associated with the monitored device.

A further object of this invention is to provide a monitoring device which utilizes the indicating means associated with the monitored device for the adjustment of the monitoring device and thereby eliminates the necessity of calibrating between separate nonlinear indicating means for the respective monitoring signal and monitored input signal.

A still further object of the present invention is to provide a monitoring device which will energize an output circuit at a predetermined input signal level and, once energized, require that input signal to be reduced below the predetermined signal level before the monitoring device may be reset.

Another further object of the present invention is to provide a monitoring device which may be integrated into the housing unit of the monitored device.

Other objects and many of the attendant advantages of the present invention will become better understood by reference to the following detailed description when considered in connection with the accompanying drawings, wherein:

FIG. 1 is a schematic diagram representing a monitoring device embodying the present invention and arranged to monitor an input signal;

FIG. 2 is a schematic diagram representing another embodiment of the present invention wherein the monitoring device monitors the deviation between an input signal and a set point signal;

FIG. 3 is a schematic diagram showing the arrangement of a monitoring amplifier utilized within the present invention.

Figure 4:
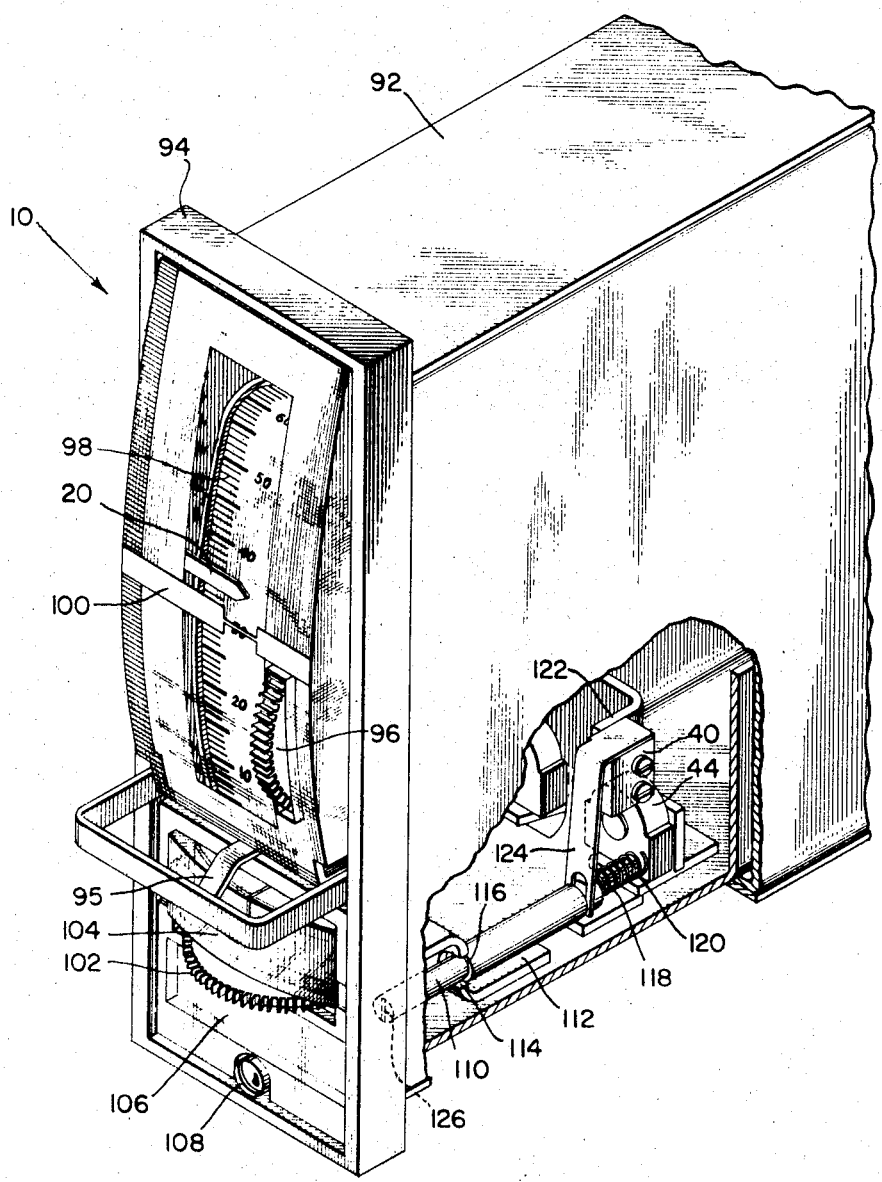
FIG. 4 is a perspective view illustrating the embodiment of a monitoring device integrally arranged within a monitored device.

Generally, the monitoring device includes an input terminal through which an input signal, hereinafter referred to as the process variable signal, is introduced to a monitored device, such as a process controller, and ultimately to a load which the process controller is governing. A set point signal is established through the utilization of a potential source and impedance means, such as a D.C. power supply and voltage dividing network, and is applied to the amplifying network of the process controller. A summing amplifier in the first stage of the amplifying network compares the difference between the set point and the input, or process variable, signals for establishing a deviation signal which is fed to a process control amplifier within the second stage of the amplifying network and utilized to adjust the controlled load. An indicating means, such as a meter, is provided for indicating the deviation signal. A switch is located between the process variable terminal and the summing amplifier for removing the process variable signal from the summing amplifier and applying a monitoring signal in its place. The monitoring signal is established by an impedance means and potential source similar to the arrangement which provides the set point signal. A monitoring amplifier receives the process variable input signal and the monitoring signals in a differenttial summing arrangement. The monitoring amplifier is electrically interconnected with a relay means for providing an output signal to the circuitry associated therewith. Thus, the monitoring signal is applied to the monitored device and adjusted by utilization of the indicator thereof for eliminating the problems of nonlinearity between separate indicating means.

Referring now to the drawings, and more particularly to FIG. 1, a monitoring device is shown generally at 10 having a process variable input terminal 12 directly connected by lead 13 to the input stage of a summing amplifier 14. The output stage of the summing amplifier 14 is connected by lead 15 to the input stage of a process control amplifier 16 through impedance means, such as an input capacitor 17. The input stage of the amplifier 16 is referenced to a virtual ground, while the output stage thereof connects to ground through a controlled load 18. An example of the circuitry used within the summing amplifier 14 may be found in the patent application Ser. No. 531,718 by William F. Newbold, filed Mar. 4, 1966 and now Patent No. 3,377,548, and assigned to the same assignee as the present invention. Further, an example of the typical circuit arrangement which may be utilized within the process control amplifier 16 may be found in a patent application Ser. No. 433,875, also by William F. Newbold, filed Feb. 19, 1966 and assigned to the same assignee as the present invention.

An indicating meter 20 is connected by one of its two terminals to the lead 15 between the output stage of the summing amplifier 14 and the input capacitor 17. The second terminal of the meter 20 is connected to ground. The meter 20 provides an indication of the deviation signal produced by the summing emplifier 14. A feedback capacitor 22 is provided having a first electrode connected to the output stage of the process control amplifier 16 and a second electrode connected to the lead 15 for forming a summing junction 23 connecting the input capacitor 17, feedback capacitor 22, and the input stage of the amplifier 16. The function of the input and feedback capacitors will be explained in greater detail hereinbelow. A double-pole double-throw switch 24–26 includes a first contact arm 24 for providing electrical continuity in the lead 15 between the summing amplifier 14 and the process control amplifier 16, in its normally closed position shown in FIG. 1. A second contact arm 26 of the double-pole switch 24–26 connects a manual loading circuitry 27 to ground in its normally closed position, as shown. An electrode of a memory capacitor 28 is connected between the common terminal of the contact arm 26 and the manual loading circuitry 27, while a second electrode thereof connects to the output stage of the process control amplifier 16. The manual loading circuitry 27 includes a potentiometer 30 having a specially adapted slide-wire 29 and a spring loaded wiper arm 31. The wiper arm 31 is disposed in a normally opened arrangement at the center of the slide-wire 29 by the urging of a spring, not shown. A power supply is provided, as illustrated by a pair of serially connected batteries 32 and 34, for establishing a positive potential at one end of the slide-wire 29 and a negative potential at the other end. The positive terminal of battery 34 connects to the negative terminal of battery 32 and to ground. By switching the double-pole double-throw switch 24–26 to its normally opened position, the contact arm 24 connects the summing junction 23 to ground, while contact arm 26 connects the input stage of the process control amplifier 16 to the output of the manual loading circuitry 27 and the memory capacitor 28.

When the switch 24–26 is in its normally closed position, the memory capacitor 28 retains a charge across its electrodes which varies according to the output of the process control amplifier 16. As switch 24–26 is placed in its normally opened position, the charge upon the memory capacitor 28 serves to retain the amplifier output at its prior potential. The normally opened position of the potentiometer 30 provides for a smooth opening of the switch 24–26 without causing a deviation of the amplifier output signal. Adjustment of the potentiometer 30 applies a positive or negative potential, depending on the direction the wiper arm 31 is displaced from its central position, to the input stage of the process control amplifier 16 for manually adjusting the amplifier output and repositioning the load 18. The input capacitor 17 and feedback capacitor 22, which connect to ground when switch 24–26 is opened, are charged to a potential which depends upon the value of the deviation signal from the summing amplifier 14 and the output signal from the process control amplifier 16, respectively. The summing junction 23 is retained in a quiescent condition through its connection to ground. Therefore, when switch 24–26 is returned to its closed position the input stage of the process control amplifier, which is connected to ground, will be free of an instantaneous change in input potential which might otherwise cause an extreme deviation of the output signal to the load 18. This arrangement thereby allows the process controller to be switched from its automatic to manual and manual to automatic control position in a "bumpless" manner.

A set point signal is established by an adjustable potentiometer 36 and a battery 38, for application to the input stage of the summing amplifier 14. The negative terminal of the battery 38 connects to one end of the slide-wire of the potentiometer 36 while the positive terminal thereof connects commonly to the opposite end thereof and to ground. In this manner, the set point signal is adjustable from a negative potential to a zero potential.

Serially connected within the lead 13 are a pair of single-pole double-throw switches 40 and 42 which, in their normally closed position, provide electrical continuity between the process variable input terminal 12 and the input stage of the summing amplifier 14. Switch 40, in its normally opened position, connects the input stage of the summing amplifier 14 to an adjustable potential source for establishing a monitoring signal. The adjustable potential source comprises a potentiometer 44 having a slide-wire serially connected at one end to a positive source of potential, such as a battery 43. The negative terminal of the battery 43 connects to the opposite end of the slide-wire and to ground for providing a potential reference source adjustable from a zero potential to a positive potential. The wiper arm of the potentiometer 44 connects to the normally open terminal of the switch 40 and through a lead 45 to the input stage of a monitoring amplifier 46. A second lead 47 connects the input stage of the monitoring amplifier 46 to the process variable input terminal 12. In this manner, the switch 40 alternately applies the process variable signal or the monitoring signal to the input stage of the summing amplifier 14, while the monitoring amplifier 46 differentially receives the process variable and the monitoring signals continuously at its input stage. The circuitry of the differential monitoring amplifier will be described in greater detail hereinbelow. The output stage of the monitoring amplifier 46 connects to a coil 48 of a relay having a normally closed contact 50 for providing a continuous connection between a pair of output terminals 52 associated therewith. In the present embodiment the monitoring amplifier 46 is arranged to remove an energizing signal from the coil 48 when the process variable signal from input terminal 12 exceeds the previously established monitoring signal. This arrangement thereby forms a monitoring device for alarming when the process variable signal becomes too high. Many forms of alarms may be provided in combination with the output terminals 52, such as a serially connected bell 53 and battery 54 which provide an audio alarm output.

In a like manner, the normally opened position of the single-pole double-throw switch 42 connects a second adjustable potential source to the input stage of the summing amplifier 14. The second adjustable potential source establishes a second monitoring signal for alarming when the process variable signal becomes too low. The adjustable potential source comprises an adjustable potentiometer 55 and a source of potential 56, such as a battery. The negative terminal of the battery 56 is mutually connected to one end of the slide-wire of potentiometer 55 and to ground for providing a potential source which is adjustable between a zero potential and a positive potential. A second differential monitoring amplifier 60 is arranged with its input stage connected to the wiper arm of the adjustable potentiometer 55 by a lead 61. The input stage thereof is also connected to the process variable input terminal 12 through a lead 62. The output stage of the second differential monitoring amplifier 60 connects to a coil 62 of a relay having a normally closed contact 64 for providing continuity between low output terminals 66. While the high and low monitoring circuits have been discussed with reference to an alarming arrangement, it should be obvious that other arrangements are possible. For example, the monitoring device could be utilized to control a large heater and, as the process approached its set point, turn off the larger heater and energize a smaller unit.

Referring now to FIG. 3, the details of the differential monitoring amplifier 46 which monitors the high input signal are shown. The input stage of the monitoring amplifier includes a first terminal 68 through which an input signal, such as the process variable signal, is introduced and a second terminal 69 through which an input signal, such as the monitoring signal, is introduced. A resistor 70 connects the terminal 68 to the base of NPN transistor 72. The transistor 72 is emitter connected to a second NPN transistor 74 through a resistor 76. A source of negative potential, not shown, is connected to a terminal 78 which in turn is connected through a resistor 80 to a junction point between the emitter of transistor 72 and the resistor 76. The collector of transistor 72 connects to an input terminal 82 and also to the emitter of a PNP transistor 84. The terminal 82 provides the input for a source of positive potential, not shown. The base of the transistor 84 is connected to the collector of the transistor 74, and an adjustable resistor 86 is connected in shunting arrangement between the base of the transistor 84 and its emitter. A capacitor 88 is provided having one electrode connected to the collector of transistor 84 and the other electrode connected to the base of the transistor 72. The relay coil 48 connects between the collector of the transistor 84 and ground. The relay is equipped with a normally closed and a normally opened contact 50 and 90, respectively. The normally closed contact 50 provides the continuity between the high output terminals 52 as described hereinabove. The normally opened contact 90 is connected in shunting arrangement around the resistor 76. The terminal 69 connects to the base of the transistor 74 through resistor 71 for completing the differential monitoring amplifier.

The differential monitoring amplifier just described is arranged to alarm as the process variable increases toward a predetermined high monitoring signal. Under normal operating conditions the amplifier produces an output signal for energizing the coil 48 and thereby closing contact 90 for bypassing the resistor 76. Under these conditions the current flowing between terminal 82 and terminal 78 is approximately equally divided between the transistors 72 and 74 which are arranged in parallel paths. As the process variable increases, the transistor 72 becomes more conductive thereby increasing the amount of current flowing through that branch of the parallel circuit and decreasing the amount of current applied to the base of the transistor 84. As the current applied to the base of the transistor 84 decreases, the transistor 84 turns off for removing the energizing current to coil 48, thus opening the contact 90 and closing the contact 50. A signal thereby passes through the contact 50 which may be utilized by an alarming device, such as the bell 53. The opening of contact 90 places the resistor 76 in the leg of the parallel circuit already conducting less than half of the current and, thus, further decreases the amount of current flow therein. Therefore, to reset the differential monitoring amplifier the potential level of the process variable signal must be dropped below the potential level of the monitoring signal by an amount determined by the resistance of the resistor 76 and the current flowing therethrough. This built-in hysteresis allows the relay coil 48 to snap off hard and remain off until the process variable signal has dropped a suitable amount below its previously established monitoring signal. The resistor 70 and capacitor 88 provide an RC filter for suppressing a surge of current which might appear at the process variable input terminal. The adjustable potentiometer 86 is provided for balancing the monitoring amplifier 46 to insure that the transistor 84 and coil 48 snap off at the point when the process variable signal equals the previously established monitoring signal.

The circuit described with reference to FIG. 3 is also utilized for the low differential monitoring amplifier 60 by reversing the connections to terminals 68 and 69. When it is desired to alarm at a predetermined low process variable signal, the monitoring signal is applied to terminal 68 and the process variable signal applied to the terminal 69. In this arrangement, as the process variable signal decreases, the transistor 74 is turned off thus decreasing the amount of current flowing in that branch of the parallel circuit and thereby turning off the transistor 84 for de-energizing the coil 62 and closing the low output contact 64.

The setting of the high and low monitoring signals may be best described by referring to FIG. 1. First, the double-throw double-pole switch 24–26 is placed in its normally opened position thereby connecting the output of the summing amplifier 14 to ground through the summing junction 23 and connecting the input of the process control amplifier 16 to the manual loading circuitry 27. In the normally opened position an adjustment of the set point potentiometer 36 or a variation of the process variable signal at the input terminal 12 will not disturb the controlled load 18. The set point potentiometer 36 is then adjusted to the setting at which an output from the monitoring amplifier is desired. For example, if it is desired to set the high alarm point, the potentiometer 36 is adjusted until the desired setting is indicated on the meter 20. At this time the single-pole switch 40 is placed in its normally opened position for removing the process variable signal from the input stage of the summing amplifier 14 and alternately applying a monitoring signal of the same polarity thereto. The potentiometer 44 is then adjusted until the meter 20 indicates a nulled position. This indicates that the monitoring signal generated by the potentiometer 44 is equal and opposite the set point signal generated by the potentiometer 36. The switch 40 is then returned to its normally closed position and the monitoring signal from the potentiometer 44 is applied exclusively to the differential monitoring amplifier 46. The potentiometer 36 is then returned to the desired set point signal and the process controller returned to its automatic controlling condition, by placing the switch 24–26 into the normally closed position. The differential monitoring amplifier will then track the process variable signal and retain the relay coil 48 in an energized condition until the process variable signal increases to a potential which equals that of the monitoring signal generated from the potentiometer 44. At this point, the monitoring amplifier 46 will de-energize the relay coil 48 thereby closing the contact 50 for providing an alarm signal across terminals 52. The low alarm point is established in a similar manner to that described hereinabove through the use of switch 42, potentiometer 55, and monitoring amplifier 60.

A mechanical embodiment of the monitoring device including the switch 40 and potentiometer 44 is shown within a process controller 10 in FIG. 4. While only the high monitoring signal switch and potentiometer are shown, it should be understood that the arrangement for the low monitoring switch 42 and potentiometer 55 is substantially the same. The process controller includes a housing shown generally at 92 and a front panel shown generally at 94. A lever arm 95 is provided for actuating the switch 24–26, and a thumb wheel 96 protrudes through the panel 94 for providing the mechanical adjustment for the set point potentiometer 36. The motion of the thumb wheel 96 and its associated potentiometer 36 is reflected by the motion of an indicating tape 98 and a fixed pointer 100. In the illustrated embodiment the indicating meter 20 is shown as a pointer which moves vertically across the indicating tape 98. A thumb wheel 102 provides the mechanical displacement of the potentiometer 30 within the manual loading circuitry 27. A meter 104 reflects a relative position of a controlled load 18. Removable translucent screen 106 covers the lower portion of the panel 94 and is secured thereto by connecting means, such as a screw 108. The removal of the translucent screen 106 exposes a pair of shafts 110, only one is shown in FIG. 4, extending through a generally U-shaped mounting bracket 112 in a mounting arrangement therewith. Mounting bracket 112 is positioned within the lower portion of the controller housing 92. Each leg of the mounting bracket 112 lies in a parallel plane with the front panel 94. An aperture 114 within the forward leg of the U-shaped mounting bracket 112 provides a slidable mounting arrangement for a radially reduced portion of the shaft 110. The radially reduced portion forms a shoulder 116 which abuts against the inner surface of the forward leg of the U-shaped mounting bracket 112. The potentiometer 44 mounts upon the inner surface of the rearward leg of the said U-shaped mounting bracket 112, and a hexagonal shaft 118 extends from the longitudinal axis of the shaft 110 through the center of the potentiometer 44 in sliding relationship therewith. A spring 120 urges the shaft 110 toward the forward end of the mounting bracket 112 thereby urging the shoulder 116 against the inner surface of the forward mounting leg of the mounting bracket 112. The rearward leg of the U-shaped bracket 112 is provided with a mounting portion 122 which is displaced in a forward direction perpendicular to the plane of the front panel 94. The switch 40 mounts on the mounting portion 122 and is provided with a leaf spring actuator 124 which is attached to the shaft 110 and urged into its normal closed position by the spring 120.

Adjustment of the high monitoring signal is thus achieved by first removing the screw 108 in the translucent screen 106. A screwdriver may then be inserted into a cleft 126 within the end of the exposed shaft 110 for displacing it in a longitudinal direction against the urging of spring 120. This longitudinal motion places the switch 40 in its normally open position for connecting the potentiometer 44 to the summing amplifier 14. A rotational motion of the shaft 110 will adjust the output of the potentiometer 44 and thereby the monitoring signal. In setting the high monitoring signal the process control amplifier is connected to the manual loading circuitry 27 by displacing the lever arm 95 thus placing the switch 24–26 in its normally opened position. The thumb wheel 96 is then displaced until the desired set point is indicated on the indicating tape 98. A screwdriver is then placed within the cleft 126, as described above, and the shaft 110 longitudinally depressed for actuating the switch 40. The monitoring signal is thereby applied to the summing amplifier 14 while rotation of the shaft 110 varies the potentiometer 44 and its associated monitoring signal. When the monitoring signal equals the set point signal the indicating meter 20 will indicate this null condition by aligning itself with the fixed pointer 100. At this point the screwdriver is removed from the shaft 110 and the switch 40 returns to its normally closed position for applying the process variable signal to the input of the summing amplifier 14. The set point signal is then returned to its desired position by rotation of the manual thumb wheel 96, and the process controller returned to its automatic controlling position by actuating the lever 95. During operation, should the process variable signal exceed the value which was established by the adjustment of the potentiometer 44, the monitoring amplifier 46 will remove the energizing signal from the relay coil 48 for closing the contact 50 and providing an output signal across the terminals 52 to be utilized by the alarm bell 53 in the present embodiment. Obviously the adjustment of the low monitoring signal is achieved in a manner similar to that just described.

Referring now to FIG. 2 a further embodiment of the present invention is illustrated wherein a monitoring device of a deviation signal, or the difference between the process variable signal and the set point signal is shown. In this embodiment a process variable signal is applied to a process variable input terminal 212 and fed along a lead 213 to the input stage of a summing amplifier 214. The output stage of a summing amplifier is connected by a lead 215 to the input stage of a process control amplifier 216 which connects to ground through a controlled load 218. A first terminal of an indicating meter 220 is connected to the lead 215 while the second terminal thereof connects to ground. A set point signal is provided at the input stage of the summing amplifier 214 by a potentiometer 236 which is connected to a suitable power supply, such as a battery 238. The positive terminal of the battery 238 is connected to one end of the potentiometer slide-wire and to ground for establishing a set point signal which is adjustable between a negative potential and a zero potential. A deviation monitoring signal is provided by a network which includes a power supply, such as batteries 240 and 242 and a potentiometer 244. The potentiometer 244 is adjustable between a positive and a negative potential. This is achieved by connecting the negative terminal of the battery 240 to one end of the slidewire of potentiometer 244 while the positive terminal thereof connects to ground and the negative terminal of battery 242. The positive terminal of battery 242 connects to the opposite end of the potentiometer slide-wire 244. The adjustable wiper arm on the potentiometer 244 connects through a lead 245 to the input stage of a differential monitoring amplifier 246. A second lead 247 connects the output stage of the summing amplifier 214 to the input stage of the monitoring amplifier 246. The output stage of the monitoring amplifier 246 is connected to ground through a relay coil 248. A normally closed contact 250 of the relay provides electrical continuity between a pair of output terminals 252. A resistor 254 is serially connected between the wiper arm of the potentiometer 244 and the lead 245, while a second resistor 256 connects between the lead 245 and ground. The voltage dividing network thus established provides a deviation monitoring signal to the monitoring amplifier.

The deviation monitoring device operates by connecting the process control amplifier to its manual loading circuitry, not shown, and adjusting the set point potentiometer 236 to the desired deviation between the process variable signal and the set point signal. This deviation is indicated by the indicating meter 220. Once the deviation is established, the potentiometer 244 is adjusted until the amplifier 246 removes the energizing signal from the relay coil 248 for closing the contact 250 and providing an output signal across terminals 252. It should be understood that the monitoring amplifier 246 is similar to that disclosed in FIG. 3. However, in the deviation monitoring device it is no longer necessary to balance the monitoring amplifier 246 to insure the removal of the energizing signal from the coil 248 when the process variable signal equals the deviation monitoring signal. In the deviation monitoring device this adjustment is automatically achieveby by adjusting the potentiometer 244 until the contact 250 closes. Thus, the shunting potentiometer 86 may be removed and replaced by a resistor, not shown.

It should be obvious that the present invention, while described in combination with a process controller, is not limited to such a combination. For example, the present invention may be utilized to monitor an electrical meter and provide an output, such as an alarm, when the meter indicates a predetermined high or low input signal. In such an ararngement the summing amplifier 14 of FIG. 1 is simplified to receive an input signal from terminal 12 and a fixed set point from the impedance means, such as would be provided from a power source 38 and a pair of fixed resistors in place of potentiometer 36. The output stage of the summing amplifier is connected exclusively to ground through the meter 20. A single-pole double-throw switch 40 is provided for alternately applying the input signal or an adjustable monitoring signal to the input stage of the summing amplifier 14. The adjustable monitoring signal is established by a network including a potentiometer 44 and a D.C. power supply 43, as described hereinabove. The differential monitoring amplifier 46 is continuously connected through its input stage for monitoring the input and monitoring signals. In a manner similar to that described hereinabove, an equality between the input signal and monitoring signal will remove an energizing signal from the relay coil 48 for closing the normally closed contact 50 and providing electrical continuity across terminals 52.

The monitoring device thus described is set by opening the switch 40 and adjusting the monitoring signal, by adjusting the potentiometer 44, until the meter 20 is driven to the high or low reading at which an alarm is desired. The switch 40 is then returned to its normally closed position and the input signal thereby returned to the input stage of summing amplifier 14. As the input signal reaches a value equalling the preadjusted monitoring signal, the monitoring amplifier removes the energizing signal from the coil 48 to provide electrical continuity across the terminals 52 and, thereby, an alarm signal.

There has been provided in accordance with the objects of the present invention a monitoring device which may be used in combination with a monitored device for establishing a high or low alarm through the utilization of electrical means characterized by the absence of mechanical adjustments associated with the indicating means. Further, there has been provided a monitoring device incorporated into a monitored device and arranged for utilization of the indicating means of the monitored device for adjusting the monitoring device and thereby eliminating calibration or adjustment for nonlinearity between said device indicators.

Many modifications and variations of the present invention will become obvious to those skilled in the art, in light of the above teachings, and it should therefore be understood that the embodiments described hereinabove are illustrations rather than limitations of the scope of the present invention. Consequently, the present invention should be limited only by the appended claims.

The embodiments of the invention in which an exclusive property or privilege is claimed are defined as follows:

1. A monitoring device for monitoring an input signal comprising, amplifying network means for receiving an input signal, first impedance means for providing a reference set point signal to said amplifying network means, said amplifying network means arranged for comparison of said input signal and said reference set point signal, indicating means associated with said amplifying network means arranged for providing an indication representative of the intensity of said input signal, second impedance means for providing a monitoring signal, monitoring amplifier means arranged for receiving said monitoring signal and said input signal, adjustable means associated with said second impedance means for establishing the level of said monitoring signal and applying said level to said monitoring amplifier means for providing a predetermined adjustment thereof, and said monitoring amplifier means including differential summing impedance means for providing an output when said input signal and said monitoring signal reach a predetermined relationship.

2. A monitoring device as described in claim 1, wherein said monitoring amplifier additionally comprises, first and second power terminals, said differential summing impedance means forming parallel legs between said first and second power terminals, a first signal terminal connected to said impedance means within one of said parallel legs, a second signal terminal connected to said impedance means within another of said parallel legs, switching means within one of said parallel legs, coil means energized by said switching means, and contact means associated with said coil means which operate when said coil means becomes energized by said switching means, said switching means responding when said input signal and said monitoring signal reach said predetermined relationship thereby operating said contact means.

3. A monitoring device as set forth in claim 2 wherein said monitoring amplifier additionally comprises, a pair of emitter connected transistorized elements forming said differential summing impedance means, a third transistorized element forming said switching means within one of said parallel legs, said first and second signal terminals each base connected to one of said emitter connected transistorized elements, and said first and second power terminals connected respectively to a common junction between said collectors and a common junction between said emitters of said emitter connected transistorized elements, whereby said third transistorized element is turned off as said input signal substantially equals said monitoring signal.

4. A monitoring device as set forth in claim 3 wherein said monitoring amplifier additionally comprises, impedance means serially connected within one of said parallel legs, and normally opened contact means associated with said coil means which closes when said coil means becomes energized for bypassing said impedance means and opens when said input signal substantially equals said monitoring signal thereby placing said impedance means within one of said parallel legs for developing a hysteresis within said monitoring amplifier and requiring said signals to become unequal by a substantial amount before said amplifier may be reset.

5. A monitoring device as set forth in claim 1, additionally comprising, a load connected to the output of said amplifying network means, and switching means for removing the output of said amplified network means from said load thereby allowing said adjustment of said set point signal and said monitoring signal without disturbing said load.

6. A monitoring device for monitoring an input signal to an amplifying network which controls a load comprising, a potential source, first impedance means connecting said potential source to said amplifying network for providing a set point signal thereto, second impedance means connected to said potential source for providing a monitoring signal, switching means arranged for removing said input signal from said amplifying network and applying said monitoring signal thereto, said switching means arranged for adjusting said second impedance means when said monitoring signal is applied to said amplifying network, indicating means commonly reflecting said set point signal and said monitoring signal and said adjustment thereof when said input signal is removed from said amplifying network, a monitoring amplifier, means connecting said input signal continuously to said monitoring amplifier, means continuously connecting said monitoring signal to said monitoring amplifier, and said monitoring amplifier being arranged for providing an output when said monitoring signal and said input signal reach a predetermined relationship.

7. A monitoring device as described in claim 6, additionally comprising, a potentiometer forming said second impedance means, a shaft engaging said potentiometer, said switching means including an arm for engaging said shaft, and means for urging said shaft toward a normally opened position of said switching means, whereby movement of said shaft closes said switching means for applying said monitoring signal to said amplifying network and further movement of said shaft adjusts said monitoring signal.

8. A monitoring device for monitoring an input signal to an amplifying network which controls a load comprising, first adjustable impedance means for providing a set point signal to said amplifying network, second adjustable impedance means for providing a monitoring signal, indicating means connected to said amplifying network and arranged to reflect a deviation between said input signal and said set point signal, a monitoring amplifier, means connecting said second adjustable impedance means and said monitoring signal produced thereby continuously to said monitoring amplifier, means connecting said deviation signal from said amplifying network continuously to said monitoring amplifier, and said monitoring amplifier being arranged for providing an output when said monitoring signal and said deviation signal reach a predetermined relation.

9. A device for monitoring an input signal received by a monitored device, comprising:
amplifying network means forming said monitored device having an input and an output stage;
indicating means associated with said amplifying network means arranged for providing an indication representative of the intensity of said input signal;
first means for providing a reference signal connected to said input stage of said amplifying network means;
monitoring amplifier means having an input and an output stage;
second means for providing a reference signal connected to said input stage of said monitoring amplifier means;
means connecting said input signal to said input stage of said amplifying network means and said monitoring amplifier means;
first adjustable means associated with said means connecting said input signal to said input stage of said amplifying network means and said monitoring amplifier means; and
second adjustable means associated with said second means for providing a reference signal to said input stage of said monitoring amplifier means arranged for adjusting said reference signal in relation to said input signal as indicated by said indicating means; whereby said monitoring amplifier means utilizes said indicating means associated with said amplifying network means during adjustment thereof.

10. A device for monitoring an input signal received by a monitored device as claimed in claim 9 wherein:
said first adjustable means associated with said means connecting said input signal to said input stage of said amplifying network means and said monitoring amplifier means includes switching means.

11. A device for monitoring an input signal received by a monitored device as claimed in claim 10 wherein, said switching means is arranged for removing said input signal from at least one of said amplifying means and instead connects said reference signal thereto.

12. A device for monitoring an input signal received by a monitored device as claimed in claim 11 wherein said switching means removes said input signal from said input stage of said amplifying network means and instead connects said reference signal from said second means, for providing a reference signal to said input stage of said monitoring amplifier means, to said amplifying network means.

13. A device for monitoring an input signal received by a monitored device as claimed in claim 9 additionally comprising, controlled element means connected to said output stage of said amplifying network means, output means connected to said output stage of said monitoring amplifier means for providing an output signal when said input signal reaches a predetermined relationship with said reference signal applied to said input stage of said monitoring amplifier means, and said first and second means for providing a reference signal to said amplifying network means and said monitoring amplifier means includes adjustable impedance means.

References Cited

UNITED STATES PATENTS

| | | |
|---|---|---|
| 2,585,589 | 2/1952 | Rockafellow. |
| 3,127,589 | 3/1964 | Harris. |
| 3,159,772 | 12/1964 | Van Doorn _____ 317—148.5 |
| 3,187,233 | 6/1965 | Kubach et al. __ 317—148.5 XR |
| 3,277,316 | 10/1966 | Harris _____ 317—148.5 XR |
| 3,311,907 | 3/1967 | Teal. |
| 3,334,341 | 8/1967 | Green _____ 317—148.5 XR |
| 3,377,548 | 4/1968 | Newbold _____ 323—100 |

JOHN F. COUCH, Primary Examiner.

W. M. SHOOP, JR., Assistant Examiner.

U.S. Cl. X.R.

318—18; 324—130; 328—147; 340—248